(12) United States Patent
Gururajan et al.

(10) Patent No.: US 11,762,990 B2
(45) Date of Patent: Sep. 19, 2023

(54) UNSTRUCTURED TEXT CLASSIFICATION

(71) Applicant: MICROSOFT TECHNOLOGY LICENSING, LLC, Redmond, WA (US)

(72) Inventors: Arunkumar Gururajan, Redmond, WA (US); Jack Wilson Stokes, III, Redmond, WA (US); Farid Tajaddodianfar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 152 days.

(21) Appl. No.: 16/917,626

(22) Filed: Jun. 30, 2020

(65) Prior Publication Data
US 2021/0312041 A1   Oct. 7, 2021

Related U.S. Application Data

(60) Provisional application No. 63/006,482, filed on Apr. 7, 2020.

(51) Int. Cl.
*G06F 21/55* (2013.01)
*G06F 16/955* (2019.01)
(Continued)

(52) U.S. Cl.
CPC ........ *G06F 21/554* (2013.01); *G06F 16/9566* (2019.01); *G06N 5/04* (2013.01); *G06N 20/00* (2019.01); *G06F 2221/034* (2013.01)

(58) Field of Classification Search
None
See application file for complete search history.

(56) References Cited

U.S. PATENT DOCUMENTS

| 8,521,667 | B2 | 8/2013 | Zhu et al. |
| 11,349,853 | B2 * | 5/2022 | Sites .................... H04L 63/1425 |

(Continued)

FOREIGN PATENT DOCUMENTS

| CN | 108667816 A | 10/2018 |
| EP | 3475822 A1 | 5/2019 |
| EP | 3716574 A1 | 9/2020 |

OTHER PUBLICATIONS

Le et al.; URLNet: Learning a URL Representation with Deep Learning for Malicious URL Detection; 2018; retrieved from the Internet: https://arxiv.org/abs/1802.03162; pp. 1-13, as printed. (Year: 2018).*

(Continued)

*Primary Examiner* — Michael W Chao
(74) *Attorney, Agent, or Firm* — SHOOK, HARDY & BACON, LLP

(57) ABSTRACT

The technology described herein identifies malicious URLs using a classifier that is both accurate and fast. Aspects of the technology are particularly well adapted for use as a real-time URL security analysis tool because the technology is able to quickly process a URL and produce a warning when a malicious URL is identified. The rapid processing speed of the technology described herein is produced, in part, by use of only a single input signal, which is the URL itself. The high accuracy produced by the technology described herein is achieved by analyzing the unstructured text on both a character-by-character level and a word-by-word level. The technology described herein uses both character-level and word-level information from the incoming URL.

20 Claims, 9 Drawing Sheets

(51) Int. Cl.
G06N 5/04 (2023.01)
G06N 20/00 (2019.01)

(56) References Cited

U.S. PATENT DOCUMENTS

| | | | | |
|---|---|---|---|---|
| 11,360,928 | B2* | 6/2022 | Li | G06F 15/173 |
| 11,399,035 | B1* | 7/2022 | Batchu | H04L 63/0227 |
| 11,425,161 | B2* | 8/2022 | Solis Agea | G06N 20/00 |
| 2011/0314546 | A1* | 12/2011 | Aziz | H04L 63/126 726/24 |
| 2018/0077120 | A1* | 3/2018 | Baughman | H04L 67/563 |
| 2018/0097822 | A1* | 4/2018 | Huang | G06N 20/00 |
| 2019/0349399 | A1 | 11/2019 | Liu et al. | |
| 2020/0036750 | A1 | 1/2020 | Bahnsen et al. | |
| 2020/0059451 | A1* | 2/2020 | Huang | G06N 7/005 |
| 2020/0104677 | A1* | 4/2020 | Rae | G06N 3/0445 |
| 2020/0267119 | A1 | 8/2020 | Huffner et al. | |
| 2020/0280583 | A1* | 9/2020 | Zhang | G06N 20/00 |
| 2020/0311519 | A1* | 10/2020 | Fei | G06F 40/284 |
| 2020/0349430 | A1 | 11/2020 | Schmidtler et al. | |
| 2020/0366712 | A1 | 11/2020 | Onut et al. | |
| 2021/0021612 | A1* | 1/2021 | Higbee | H04L 63/1491 |
| 2021/0218754 | A1* | 7/2021 | Zou | H04L 63/145 |
| 2021/0377303 | A1* | 12/2021 | Bui | G06N 20/20 |
| 2021/0392106 | A1* | 12/2021 | Rajeev | H04L 51/046 |
| 2022/0217160 | A1* | 7/2022 | Morgan | G06F 16/951 |
| 2022/0279014 | A1 | 9/2022 | Stokes et al. | |
| 2022/0335278 | A1* | 10/2022 | Wu | G06N 3/065 |
| 2022/0375222 | A1* | 11/2022 | Uhlenbrock | G06V 10/764 |
| 2022/0378305 | A1* | 12/2022 | Peterson | G06N 3/08 |

OTHER PUBLICATIONS

Patel; Convolutional Neural Networks—A Beginner's Guide; 2019; retrieved from the internet; pp. 1-13, as printed. (Year: 2019).*

Bojanowski, et al., "Enriching Word Vectors with Subword Information", In Proceedings of Transactions of the Association for Computational Linguistics, vol. 5, Jun. 2017, pp. 135-146.

Conneau, et al., "Very Deep Convolutional Networks for Text Classification", In the Repository of arXiv:1606.01781, Jan. 27, 2017, 10 Pages.

He, et al., "Spatial Pyramid Pooling in Deep Convolutional Networks for Visual Recognition", In Journal of IEEE Transactions on Pattern Analysis and Machine Intelligence, vol. 37, Issue No. 9, Jan. 9, 2015, pp. 1904-1916.

Hendler, et al., "Detecting Malicious PowerShell Scripts Using Contextual Embeddings", In the Repository of arXiv:1905.09538v1, May 23, 2019, 17 Pages.

Joulin, et al., "Bag of Tricks for Efficient Text Classification", In the Proceedings of Conference of the European Chapter of the Association for Computational Linguistics, vol. 2, Apr. 3, 2017, pp. 427-431.

Khonji, et al., "Phishing detection: A literature survey", In Journal of IEEE Communications Surveys and Tutorials, vol. 15, Issue 4, Apr. 15, 2013, pp. 2091-2121.

Le, et al., "URLNet: Learning a URL Representation with Deep Learning for Malicious URL Detection", In the Repository of arXiv:1802.03162v1, Feb. 9, 2018, 13 Pages.

Mikolov, et al., "Distributed-Representations-of-Words-and-Phrases-and Their-Compositionality", In the Proceedings of Advances in Neural Information Processing Systems, Dec. 5, 2013, 9 Pages.

Paszke, et al., "Automatic Differentiation in PyTorch", In Proceedings of the 31st Conference on Neural Information Processing Systems, Dec. 4, 2017, 4 Pages.

Rehurek, et al., "Software Framework for Topic Modelling with Large Corpora", In Proceedings of the LREC Workshop on New Challenges for NLP Frameworks, May 2010, pp. 46-50.

Sahoo, et al., "Malicious URL Detection using Machine Learning: A Survey", In the repository of arXiv:1701.07179, Aug. 21, 2019, 37 Pages.

Szegedy, et al., "Going Deeper with Convolutions", In Proceedings of the IEEE Conference on Computer Vision and Pattern Recognition, Jun. 7, 2015, 9 Pages.

Zhang, "Character-level Convolutional Networks for Text Classification", In the Journal of Advances in Neural Information Processing Systems, Dec. 7, 2015, 9 Pages.

Zhang, et al., "Text Understanding from Scratch", In the Repository of arXiv:1502.01710, Apr. 4, 2016, 10 Pages.

Oh, et al., "THOMAS: The Hegemonic OSU Morphological Analyzer using Seq2seq", In the Proceedings of Workshop an Computational Research in Phonetics, Phonology, and Morphology, Aug. 2, 2019, pp. 80-86.

"2019 Internet Crime Report", Retrieved From: https://www.ic3.gov/Media/PDF/AnnualReport/2019_IC3Report.pdf, Feb. 12, 2020, 28 Pages.

"Phishing Attacks at Highest Level in Three Years", Retrieved From: https://www.helpnetsecurity.com/2019/11/07/phishing-attacks-levels-rise/, Nov. 7, 2019, 3 Pages.

"PyTorch: From Research to Production", Retrieved From: http://web.archive.org/web/20201017005110/https://pytorch.org/, Oct. 17, 2020, 3 Pages.

"Making the World's Information Safely Accessible", Retrieved From: http://web.archive.org/web/20201017003718/https://safebrowsing.google.com/, Oct. 17, 2020, 8 Pages.

"The Rise of Single-Use Phishing URLs and the Need for Zero-Second Detection", Retrieved From: https://web.archive.org/web/20200930233011/https://zvelo.com/single-use-phishing-urls-need-zero-second-detection/, Aug. 27, 2019, 7 Pages.

"Transformer (Machine Learning Model)", Retrieved From: https://en.wikipedia.org/wiki/Transformer_(machine_learning_model), Oct. 3, 2021, 7 Pages.

Ba, et al., "Layer Normalization", In Repository of arXiv:1607.06450v1, Jul. 21, 2016, 14 Pages.

Blum, et al., "Lexical Feature based Phishing URL Detection Using Online Learning", In Proceedings of the 3rd ACM Workshop on Artificial Intelligence and Security, Oct. 8, 2010, pp. 54-60.

Devlin, et al., "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Goodfellow, et al., "Explaining and Harnessing Adversarial Examples", In Repository of arXiv:1412.6572v1, Dec. 20, 2014, 10 Pages.

He, et al., "Deep Residual Learning for Image Recognition", In Proceedings of the IEEE Conference on Computer Vision and Pattern Recognition, Jun. 27, 2016, pp. 770-778.

Hu, et al., "Learning Data Manipulation for Augmentation and Weighting", In Proceedings of the 33rd International Conference on Neural Information Processing Systems, Dec. 8, 2019, 12 Pages.

Huang, et al., "Phishing URL Detection Via Capsule-Based Neural Network", In Proceedings of 13th International Conference on Anti-counterfeiting, Security, and Identification, Oct. 25, 2019, pp. 22-26.

Kanade, et al., "Learning and Evaluating Contextual Embedding of Source Code", In Proceedings of 37th International Conference on Machine Learning, Jul. 13, 2020, 12 Pages.

Kingma, et al., "Adam: A Method for Stochastic Optimization", In Repository of arXiv:1412.6980v1, Dec. 22, 2014, 9 Pages.

Kobayashi, Sosuke, "Contextual Augmentation: Data Augmentation by Words with Paradigmatic Relations", In Proceedings of the Conference of the North American Chapter of the Association for Computational Linguistics: Human Language Technologies, NAACL-HLT, vol. 2 (Short Papers), Jun. 1, 2018, pp. 452-457.

Liu, et al., "RoBERTa: A Robustly Optimized BERT Pretraining Approach", In Repository of arXiv:1907.11692v1, Jul. 26, 2019, 13 Pages.

Maneriker, et al., "URLTran: Improving Phishing URL Detection Using Transformers", In Repository of arXiv:2106.052561, Jun. 9, 2021, 10 Pages.

Mjcaparas, et al., "Microsoft Defender SmartScreen", Retrieved From: https://web.archive.org/web/20201023063029/https://docs.

(56) References Cited

OTHER PUBLICATIONS microsoft.com/en-us/windows/security/threat-protection/microsoft-defender-smartscreen/microsoft-defender-smartscreen-overview, Nov. 27, 2019, 5 Pages.
Peng, et al., "A Joint Approach to Detect Malicious URL Based on Attention Mechanism", In International Journal of Computational Intelligence and Applications, vol. 18, Issue 3, Jul. 10, 2019, 14 Pages.
Radford, et al., "Language Models are Unsupervised Multitask Learners", In Journal of OpenAI Blog, vol. 1, Issue 8, Feb. 24, 2019, 24 Pages.
Rasymas, et al., "Detection of Phishing URLs by Using Deep Learning Approach and Multiple Features Combinations", In Baltic Journal of Modem Computing, vol. 8, Issue 3, 2020, pp. 471-483.
Ren, et al., "A Bi-Directional LSTM Model with Attention for Malicious URL Detection", In Proceedings of 4th Advanced Information Technology, Electronic and Automation Control Conference, vol. 1, Dec. 20, 2019, pp. 300-305.
Rogers, et al., "A Primer in BERTology: What We Know About How BERT Works", In Repository of arXiv:2002.123271, Feb. 27, 2020, 15 Pages.
Schuster, et al., "Japanese and Korean Voice Search", In Proceedings of International Conference on Acoustics, Speech and Signal Processing, Mar. 25, 2012, pp. 5149-5152.
Sennrich, et al., "Neural Machine Translation of Rare Words with Subword Units", In Proceedings of the 54th Annual Meeting of the Association for Computational Linguistics (vol. 1: Long Papers), Aug. 7, 2016, pp. 1715-1725.
Tajaddodianfar, et al., "Texception: A Character/Word-Level Deep Learning Model for Phishing URL Detection", In Proceedings of International Conference on Acoustics, Speech and Signal Processing, May 4, 2020, pp. 2857-2861.
Taylor, Wilson L., ""Cloze Procedure": A New Tool for Measuring Readability", In Journal of Journalism Quarterly, vol. 30, Issue 4, Sep. 1953, pp. 415-433.
Vaswani, et al., "Attention Is All You Need", In Proceedings of 31st Conference on Neural Information Processing Systems, Dec. 4, 2017, 11 Pages.
Wang, et al., "RAT-SQL: Relation-Aware Schema Encoding and Linking for Text-to-SQL Parsers", In Proceedings of the 58th Annual Meeting of the Association for Computational Linguistics, Jul. 5, 2020, pp. 7567-7578.
Wolf, et al., "Transformers: State-of-the-art Natural Language Processing for PyTorch and TensorFlow 2.0", Retrieved From: https://web.archive.org/web/20201016110428/https://github.com/huggingface/transformers, Oct. 16, 2020, 10 Pages.
Wu, et al., "Google's Neural Machine Translation System: Bridging the Gap between Human and Machine Translation", In Repository of arXiv:1609.08144v1, Sep. 26, 2016, 23 Pages.
Yerima, et al., "High Accuracy Phishing Detection Based on Convolutional Neural Networks", In Proceedings of International Conference on Computer Applications & Information Security, Mar. 19, 2020, 6 Pages.
Yin, et al., "TaBERT: Pretraining for Joint Understanding of Textual and Tabular Data", In Proceedings of the 58th Annual Meeting of the Association for Computational Linguistics, Jul. 5, 2020, pp. 8413-8426.
Zhang, et al., "Effective Subword Segmentation for Text Comprehension", In IEEE/ACM Transactions on Audio, Speech, and Language Processing, vol. 27, Issue 11, Nov. 2019, pp. 1664-1674.
Radford, et al., "Improving Language Understanding by Generative Pre-Training", Retrieved From: http://web.archive.org/web/20190311213605/https://s3-us-west-2.amazonaws.com/openai-assets/research-covers/language-unsupervised/language_understanding_paper.pdf, Mar. 11, 2019, 12 Pages.
"International Search Report and Written Opinion Issued in PCT Application No. PCT/US2021/026194", dated Jul. 15, 2021, 14 Pages.
Tupsamudre, et al., "Everything Is in the Name—A URL Based Approach for Phishing Detection", In Lecture Notes in Computer Science book series (LNCS, vol. 11527), May 19, 2019, pp. 240-248.
Lee, et al., "CATBERT: Context-Aware Tiny BERT for Detecting Social Engineering Emails", In Repository of arXiv:2010.03484v1, Oct. 7, 2020, 11 Pages.
"International Search Report and Written Opinion Issued in PCT Application No. PCT/US2022/017397", dated May 16, 2022, 14 Pages.
Brown, et al., "Language Models are Few-Shot Learners", In Repository of arXiv:2005.14165v4, Jul. 22, 2020, pp. 1-75.
U.S. Appl. No. 63/006,482, filed Apr. 7, 2020.
PCT/US21/26194, Apr. 7, 2021.

\* cited by examiner

UNSTRUCTURED TEXT CLASSIFICATION

CROSS REFERENCE TO RELATED APPLICATIONS

This application claims the benefit of U.S. Provisional Application No. 63/006,482, filed Apr. 7, 2020, titled UNSTRUCTURED TEXT CLASSIFICATION.

BACKGROUND

Electronic content, such as webpages and emails, are widely used communication tools that provide a quick and inexpensive method of communication between individuals and groups. Increasingly, spam emails and webpages, phishing emails and webpages, and emails that include or link to malicious programs (e.g., malware, ransomware) pose risks to users, companies, and computing devices. In the past, efforts have been made to identify unwanted and/or malicious content before the content is received by a user using a filtering system. The filtering system may use natural language processing or other mechanisms to classify an email or webpage accordingly to a variety of characteristics. Many of these characteristics are constantly changing. Making crude filters that use a "black list" of malicious characteristics miss large amounts of newly added malicious content. For example, it is easy to create and start using a new Uniform Resource Locator (URL) that would not be on any lists. At present, no filtering system is perfect. Some benign content is misclassified as malicious, while other malicious content reaches users. Further, real-time filters used during browsing can add a significant latency to a browsing experience.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein identifies malicious URLs or other unstructured text using a classifier that uses computing resources more efficiently by eliminating signals typically processed when classifying a URL. The present technology may use the URL itself as the only input. Using a single input is more efficient than using multiple inputs. Using a single input also reduces latency because less time elapses when less information is processed.

This technology uses a single input, while the prior art typically uses multiple inputs (e.g., context, metadata) that each need to be processed. A system that uses multiple signals may not achieve the speed desired for real-time evaluation of URLs. URLs are difficult to evaluate because they do not follow grammatical conventions, include nonsense words and terms, and otherwise are defy accurate classification by natural language processing techniques that are trained and built using grammatical text as input. The high accuracy produced by the technology described herein is achieved by analyzing the unstructured text on both a character-by-character level and a word-by-word level. The technology described herein uses both character-level and word-level information from the incoming URL and does not depend on manually crafted features or feature engineering. Using the classifier to process the URL as groups of characters and as one or more words provides improved accuracy over just evaluating the URL as characters or words.

The parallel layers evaluating words may each look for word groups of different lengths. For example, a first layer may evaluate a single word, a second layer a group of two words, and so on. These layers may be parallel. The outputs from the parallel word processing layers are eventually merged in the classifier and processed together. The parallel usage of convolutional layers allows the technology to generalize better for new URLs. The technology described herein is able to outperform a traditional text classification method by increasing the true positive rate at an extremely low false positive rate, which is crucial for healthy operation at Internet scale. This is achieved through the parallel processing of both characters and words from the URL in combination with the other features described herein.

Aspects of the technology are particularly well adapted for use as a real-time URL security analysis tool because the technology is able to quickly process a URL and produce a warning or other automated response when a malicious URL is identified. A real-time URL security analysis evaluation can be used on the client or server side for multiple applications including during a user's browser session, to evaluate links in emails as they are received, evaluate social media posts containing URLs as they are published, and the like.

BRIEF DESCRIPTION OF THE DRAWINGS

Aspects of the invention are described in detail below with reference to the attached drawing figures, wherein.

DETAILED DESCRIPTION

Figure 1:
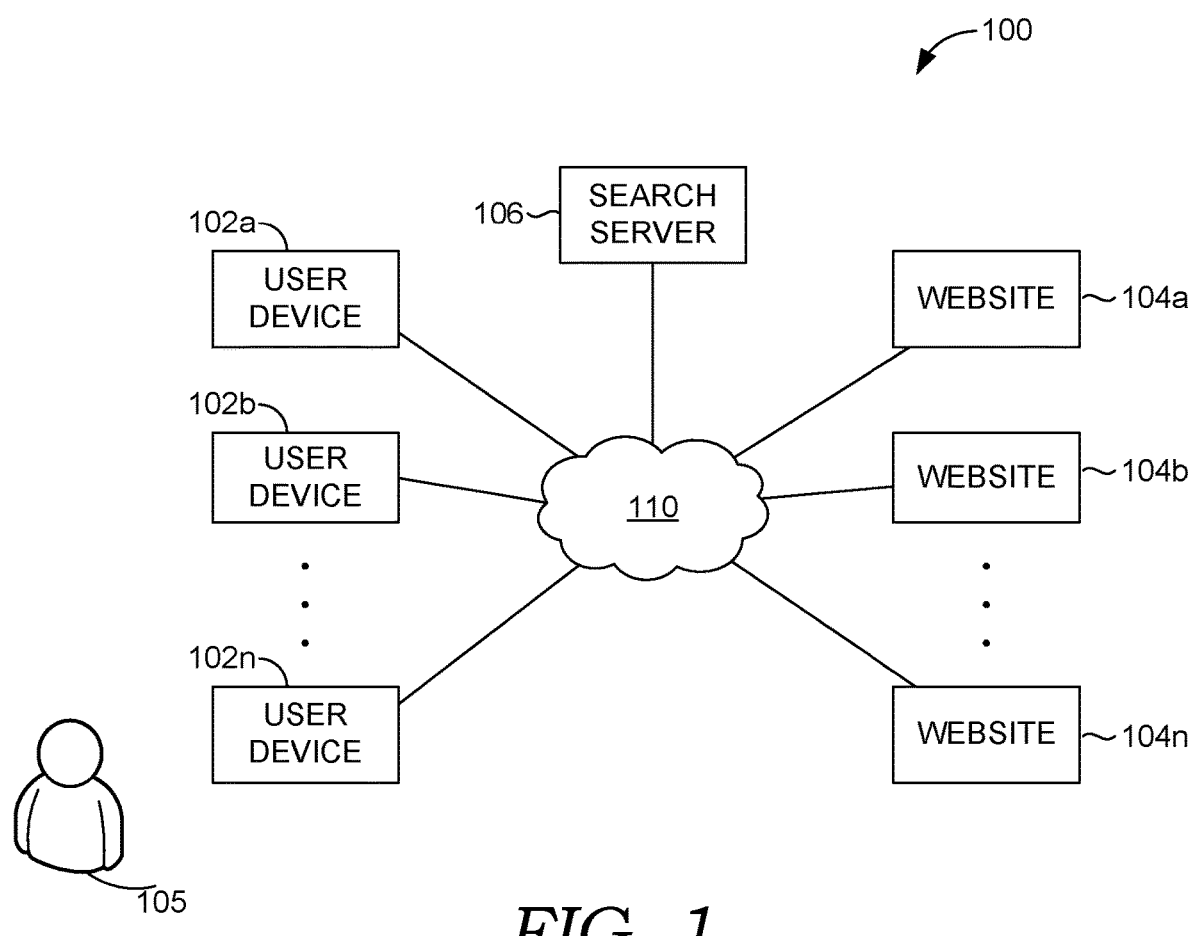
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein identifies malicious URLs using a classifier that is both accurate and fast. Aspects of the technology are particularly well adapted for use as a real-time URL security analysis tool because the technology is able to quickly process a URL and produce a warning or other automated response when a malicious URL is identified. A real-time URL security analysis evaluation can be used on the client or server side for multiple applications including during a user's browser session, to evaluate links in emails as they are received, evaluate social media posts containing URLs as they are published, and the like.

The technology described herein uses computing resources more efficiently because the URL being classified may be the only input to the classifier. Using a single input also reduces latency because less information needs to be processed. This technology uses a single input, while the prior art typically uses multiple inputs (e.g., context, metadata) that each need to be processed. The rapid processing speed of the technology described herein is produced, in part, by use of only a single input signal, which is the URL itself. In aspects, the URL is the only input to the classifier. Using only a single signal increases the speed of the evaluation process by eliminating processing steps required for each input signal evaluated. A system that uses multiple signals may not achieve the speed desired for real-time evaluation of URLs. Aspects of the technology are not limited for use with the URL and could be used with other unstructured text found in electronic documents, such as email, social media posts, and webpages. In aspects, a single unstructured text from a content being classified is the only input to the classification process. As used herein, unstructured means without metadata.

The technology described herein produces improved accuracy. The high accuracy produced by the technology described herein is achieved by analyzing the unstructured text on both a character-by-character level and a word-by-word level. The technology described herein uses both character-level and word-level information from the incoming URL and does not depend on manually crafted features or feature engineering. Using the classifier to process the URL as groups of characters and as one or more words provides improved accuracy over just evaluating the URL as characters or words.

The technology described herein uses multiple parallel convolutional layers to process both words and characters from a URL at the same time. In one aspect, the classifier architecture includes a word-level path that is parallel to a character-level path. The word-level path receives as input word-level embedding vectors while the character-level path receives as input character-level embedding vectors.

Within the character-level path, accuracy is improved by using parallel character-level layers that each receive character n-grams of different length. For example, a first parallel layer may process an n-gram of two characters (i.e., bigram), another parallel layer processes n-gram of three characters, another four, and so on. The outputs from the parallel character processing layers are eventually merged in the classifier and processed together.

The parallel layers evaluating words may each look for word groups of different lengths. For example, a first layer may evaluate a single word, a second layer a group of two words, and so on. These layers may be parallel. The outputs from the parallel word processing layers are eventually merged in the classifier and processed together. The parallel usage of convolutional layers allows the technology to generalize better for new URLs. The technology described herein is able to outperform a traditional text classification method by increasing the true positive rate at an extremely low false positive rate, which is crucial for healthy operation at Internet scale. This is achieved through the parallel processing of both characters and words from the URL in combination with the other features described herein.

Many computer security-related services need to verify that a URL (Uniform Resource Locator) does not provide the location of a malicious web page on the Internet. In particular, the technology can generate a URL classification to detect phishing attacks. Phishing can be broadly defined as a type of social engineering attack via electronic channels that tricks humans into performing certain actions for the attacker's benefit. These actions could include harvesting passwords or bank account numbers, which are then sold on the black market. To this end, the technology described herein provides a novel character-level and word-level deep learning model, which learns to detect malicious URLs associated with these phishing web sites.

There are many signals that one could consider as features for models that detect phishing pages including the requestor's URL, URI, static HTML content, DOM of the page, and screenshot of the page. Most of these raw signals need a significant level of transformation in order to be leveraged as useful features, which often requires a non-trivial amount of time to be spent on feature engineering. The technology described herein takes a URL as input and predicts whether the URL belongs to a phishing attack or is otherwise malicious. The technology may also be applied to other unstructured text found on webpages, emails, and other digital content. While the technology described herein is not limited to use with URLs, most of the following description will use URLs as the example input.

In addition to real-time classification, the technology described herein is useful for detecting "potential" phishing domains. Potential domains are newly registered domains that have not yet hosted malicious content, but have a high probability of doing so in the near future. In this scenario, where the domain is not hosting any content, the only signal that may be leveraged is often the URL.

The technology described herein can use contextual embeddings. The basic idea in contextual embedding is to construct a vocabulary of words in a text corpus and assign a low-dimensional randomly initialized dense vector to each word. During training, which can be unsupervised, each sentence from the corpus is tokenized to extract words, and the algorithm targets either predicting the surrounding words for a given word (i.e., skipgram architecture) or predicting a single word given its surrounding words or context (i.e., Continuous Bag of Words or CBOW architecture). Vectors assigned to each word are adjusted to optimize for this task, and the trained embedding vectors are expected to reflect contextual relationships. After training, words that have similar meaning are closely located in the embedding space. Word embeddings trained on large text corpuses can be used as inputs for the downstream model. In the phishing detection problem, however, such pre-trained vectors are not useful because words that appear in the corpus of URLs are not similar to any language corpus. Therefore, the technology described herein builds a unique set of embeddings for a word-based analysis, essentially building a unique vocabulary for text-strings found in a corpus of URLs. The "words" in the URL context can be a series of n-grams of different sizes found within a corpus of actual URLs. Words in the URL "msn.com" could include "msn," "." and "com." N-grams that reoccur with above a threshold frequency within the corpus of URLs will be added to the URL vocabulary. In an aspect, a word is represented by a series of n-grams. For example, the word "accommodation" can be represented by a vector of 4-grams: <"acco", "ccom", "comm", "ommo" "mmod", "moda", "odat", "dati", "atio", "tion"> In an aspect, word embedding vectors are generated based on the n-grams. Words that are close in the sense that they have similar n-grams will have embedding vectors that are also close.

Training the classifier requires training data. In this case, the training data may be a group of URLs and a binary phishing grade (phishing/benign) for each URL. The grades serve as the labels for training and evaluating the model used in classification. The training data can be based on a phishing classification of real-world URLs. In general, it may be desirable to build a training group with at least 5% of the data instances being phishing URLs.

As mentioned, the technology described herein uses both character and word embeddings that are known to be more efficient than traditional Bag-Of-Words (BOW) techniques. For the character embeddings, an alphabet of all characters that occur in the training corpus is built and then assigned a lookup table that takes the integer index of each character in the alphabet and returns a low-dimensional dense vector that is trained during the network training. Two additional indexes are reserved for unknown characters and the empty space. The technology also defines the maximum number of characters to be processed in each URL. Longer URLs are trimmed and shorter ones are padded with the empty character to meet this maximum value. With these hyper-parameter settings, each input URL is mapped to a dense matrix of character embeddings, as described in more detail subsequently with reference to FIG. 3.

Definitions

An Artificial Neural Network (ANN) is a computing processing module in hardware or software that is inspired by elements similar to those found in a biological neuron. For example, a variable input vector of length N scalar elements v1, v2, . . . vN are weighted by corresponding weights wi, and to an additional bias b0, and passed through hard or soft non-linearity function h( ) to produce an output. In an aspect, the nonlinearity is for example a sign function, a tanh function, a function that limits the maximum and/or minimum value to a programmable output, or a ReLU function. An ANN may produce output equal to h (v1*w1+ v2*w2+ . . . +vN*wN+b0). Such networks "learn" based on the inputs and on a weight adjustment method. Weights may be adjusted iteratively based on evaluating the ANN over a data set while modifying the weights in accord with a learning object. One or more classification techniques may be used, such as gradient boosted decision tree binary classification. In an aspect, decision trees may be used as classifiers since decision trees may be easier to visualize and integrate into practical solutions.

A Convolutional Layer is a layer of processing in a Convolutional Neural Net (CNN) hierarchy. A layer is a set of adjacent neurons that have a small and adjacent receptive field. A CNN may have a number of defined layers. In an aspect, the number of network layers may be defined within a CNN component, such as 6-layers, 16-layers, 19-layers or 38-layers.

A Convolutional Neural Network (CNN) is an ANN that performs operations using convolution operations, often for image data. A CNN may have several layers of networks that are stacked to reflect higher-level neuron processing. A CNN Neuron's may be fully connected or partially connected to a succeeding layer. One or more layers may be skipped in providing a neuron output to a higher layer. The convolutions may be performed with the same resolution as the input, or a data reduction may occur with the use of a stride different from 1. The output of a layer may be reduced in resolution through a pooling layer. A CNN may be composed of several adjacent neurons, which only process inputs in a receptive field that is much smaller than the entire image. Examples of CNN components include ZF Net, AlexNet, GoogLeNet, LeNet, VGGNet, VGG, ResNet, DenseNet, etc.

A Corpus is a collection of data samples of the same kind. For example, a corpus of URLs associated with web traffic is a group of URL's for some period monitored by a security component. A security component may perform analysis on URLs and associate labels from the security analysis with each URL. The result is a pair comprising the URL and an associated label. The collection of pairs is the Corpus.

A norm is a generally positive length measure over a vector space. In an aspect, a norm comprises a seminorm. A 2-norm is the square root of the sum of the squares of the elements (2-norm). A 1-norm is the sum of the absolute values of the vector elements. A p-norm is a quantity raised to the 1/p power that includes a sum of the absolute values of the vector elements, wherein each absolute value of an element is raised to the p power. An infinity norm is the max over the vector elements of the absolute value of each vector element.

A Residual Neural Network is an ANN that feeds neural output to a layer beyond the adjacent layer, skipping one or more layers, so that the receiving layer forms a result that includes the neural input from a non-adjacent layer Having briefly described an overview of aspects of the technology described herein, an exemplary operating environment in which aspects of the technology described herein may be implemented is described below.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of websites, such as websites 104a and 104b through 104n;

search server 106; and network 110. It should be understood that environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and websites may be employed within operating environment 100 within the scope of the present disclosure. Each may comprise a single device or multiple devices cooperating in a distributed environment. For instance, search server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while search server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of search server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with one or more user devices. The user may communicate with search server 106, websites 104a and 104b through 104n, through the user devices.

A goal of the technology described herein is to make sure that the user devices are warned about malicious websites. The websites 104a and 104b through 104n may comprise benign website and malicious websites, such as phishing sites. The user devices 102a and 102b through 102n may access the websites through a browser. The user may find the websites through search results provided by the search service 106 in response to a query. A user of user devices 102a and 102b through 102n could navigate to websites 104a and 104b through 104n by clicking on a hyperlink embedded in a webpage, in an email, in a social media post, through an application, and the like. A user could also simply type a URL in the browser's address box. Aspects of the technology described herein will evaluate the URL and provide a warning if the URL is classified as malicious. The analysis and warning could be performed entirely on user devices 102a and 102b through 102n, solely by the search server 106, or through a combination. The search server 106 can also be used to collect training data for the classifier.

Security components on the server or client can take direct action in addition to or instead of warning the user. For example, access to a website associated with a URL classified as phishing could be blocked by a browser. A client or server-based email system could disable a hyperlink to a URL classified as phishing. A search engine could prevent the display of search results with a link to a URL classified as phishing. A social media platform or social media application could delete or otherwise block access to a social media post that includes a link to a URL classified as phishing. The social media user who posted the offending social media post could be warned. The social media user can be put on a list of social media users warranting further investigation to determine whether the account is a phishing account or otherwise fraudulent. Upon detecting above a threshold of social media posts that link to phishing URLs, the social media account could automatically be suspended.

Figure 2:
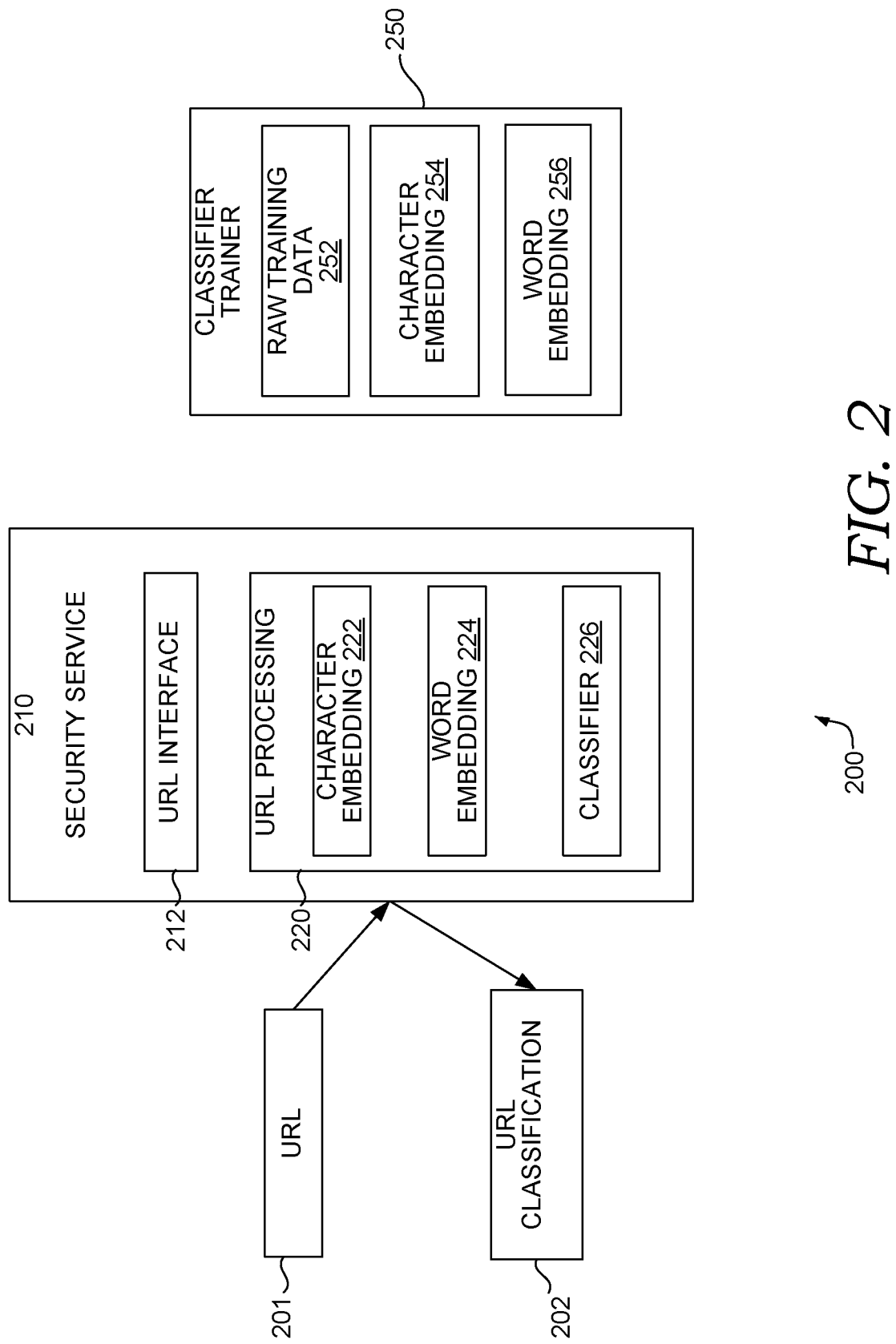
FIG. 2 is a diagram showing a format selection environment, according to an aspect of the technology described herein.

Operating environment 100 can be utilized to implement one or more of the components of system 200, described in FIG. 2, including components for classifying URLs and warning users.

Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

At a high level, system 200 comprises a security service 210 that receives a URL 201 and returns a classification 202 that indicates whether the URL is malicious or benign. Here malicious is described as anything that is not benign, such as phishing websites. The security service 210 may be embodied on one or more servers, such as search server 106. Aspects of the search service could be distributed on a user device, such as device 102a. In one aspect, the classifier 226 is trained on a server by classifier trainer 250 and then communicated to a user device.

Example system 200 includes the security service 210 (including its components 212, and 220) and classifier trainer 250. The security service 210 (and its components) and classifier trainer 250 (and its components) may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more personal assistant applications, browsers, services, or routines. In particular, such applications, services, or routines may operate on one or more user devices (such as user device 102a), servers (such as search server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

Before the classifier 226 can classify a URL, it needs to be trained by the classifier trainer 250. Initially, the classifier 226 can have the architecture described in FIGS. 4 and 5, but not be able to classify URLs accurately. The classifier trainer 250 takes the raw training data instances in training data 252, which comprise URLs and corresponding labels as input to build a trained classifier 226. Once trained, the classifier 226 can classify unlabeled URLs.

Layers in the classifier 226 comprise neurons. In this particular case, the input layer neurons receive a character or word embedding of the URL and pass data derived from the embeddings to neurons in multiple hidden layers. Neurons in the hidden layers pass on the results of their computations to the additional layer, until the results get to the output layer. The output layer then produces probability values for each individual segment classification. Different types of layers and networks connect neurons in different ways.

Neurons have an intrinsic activation function that computes its output given an input (a vector of numbers) that is multiplied by another vector of numbers (called weights). The weights are the adjustable parameters that cause a neural network to produce a correct output given previous known matches between input-output. For example, if the training URL was labeled benign then the correct output is to classify the URL as benign. The weights are adjusted during training. Once trained, the weight associated with a given neuron can remain fixed. The other data passing between neurons can change in response to a given input (e.g., URL). Retraining the network with additional training data can update one or more weights in one or more neurons.

In each type of deep model, training is used to fit the model output to the training data. In particular, weights associated with each neuron in the model can be updated through training. Originally, the model can comprise random weight values that are adjusted during training. Training in this context is done in multiple iterations, and each iterations comprises multiple steps: forward pass, a loss function calculation and backpropagation, where the weights are updated given mistakes made by the neural network during training. This process is repeated for multiple batches of training images. The goal is to update the weights of each neuron (or other model component) to cause the model to produce an output that maps to the correct label for as many URLs as possible. The training data comprises labeled URLs. Each labeled URL is input to the model and used to train it. Once a sufficient number of training URLs are fed to the model used by classifier 226 and the model stops improving or improves slowly during training, then the training can stop. The model can then be used to classify unlabeled images (e.g., not training documents).

The raw training data 252 can include anonymized browsing telemetry data that is primarily comprised of a URL with a phishing grade. In an aspect, the phishing grade is an integer between 0 and 5. In an aspect, a phishing grade is either safe 0 or a suspected 1. The grades serve as labels for training and evaluation of a classifier 226. In an aspect, a portion of the corpus is set aside for training data and the other portion reserved for testing the accuracy of the classifier 226. When a class imbalance exists in the raw data, the benign class is down-sampled to improve training set balance. In an aspect, the threat class makes up 5% of the total data used in training. A portion of a corpus is selected with stratified sampling to construct a validation set with the same class balance.

During training, data from the training corpus is presented to the classifier 226 as a sequence of URLs. Each URL is evaluated by the classifier 226 and classified without the classifier 226 being aware of the truth data. If classifier 226 misclassifies a URL, the connections, weights, parameters and biases of one or more ANNs within the classifier 226 are adapted to improve the classifier 226.

In an aspect, the classifier 226 is trained using PyTorch deep learning framework. Exemplary configuration includes a binary cross-entropy loss function along with an SGD optimizer with momentum equal to 0.9 and learning rate initialized at 0.01. In an aspect, training is performed for 30 epochs with the minibatch size set to 128, and at the end of each epoch, validation scores are obtained. A model with the best validation loss is returned after the final model for each experiment. The learning rate can be halved every 5 epochs.

The character-embedding component 254 builds character vectors for training input, but can also build the vector space for character understanding. The word-embedding component 256 builds word vectors for training input, but can also build the vector space for word understanding.

The URL is one example of unstructured text comprising a group of symbols. A symbol may be for example a character or a word in an analogized sentence of unstructured data. As mentioned, the technology described herein does both a word-based and character-based analysis of URLs.

As an initial step performed by the character-embedding component 254, characters within the URL are identified. In an aspect, each character in an alphabet is assigned an integer index. Additional indexes are reserved for unknown characters and the empty space. Each character in the alphabet is assigned an M-dimensional embedding vector such as a 32 dimensional numerical array. In an aspect, a dimension is a scalar, such as an integer, floating point number, or value of a scalar over a field. In an aspect, a lookup table is formed by storing an embedding vector in association with each symbol defined for an alphabet. In an aspect, the elements of an embedding vector are randomly assigned.

In an aspect, each character in a length L of the URL is matched to a character in the alphabet. In an aspect, a long URL is trimmed to length L, such as by taking the first L characters. In an aspect, a short URL is padded with empty characters to a length L. In an aspect, L is controlled as a parameter. In an aspect, L=1000, or 500, or 200.

In an aspect, each character in the URL of a length L is assigned an embedding vector, and each embedding vector is assigned a sequential column in the order of the characters in the URL to produce a matrix of character embeddings.

Figure 3:
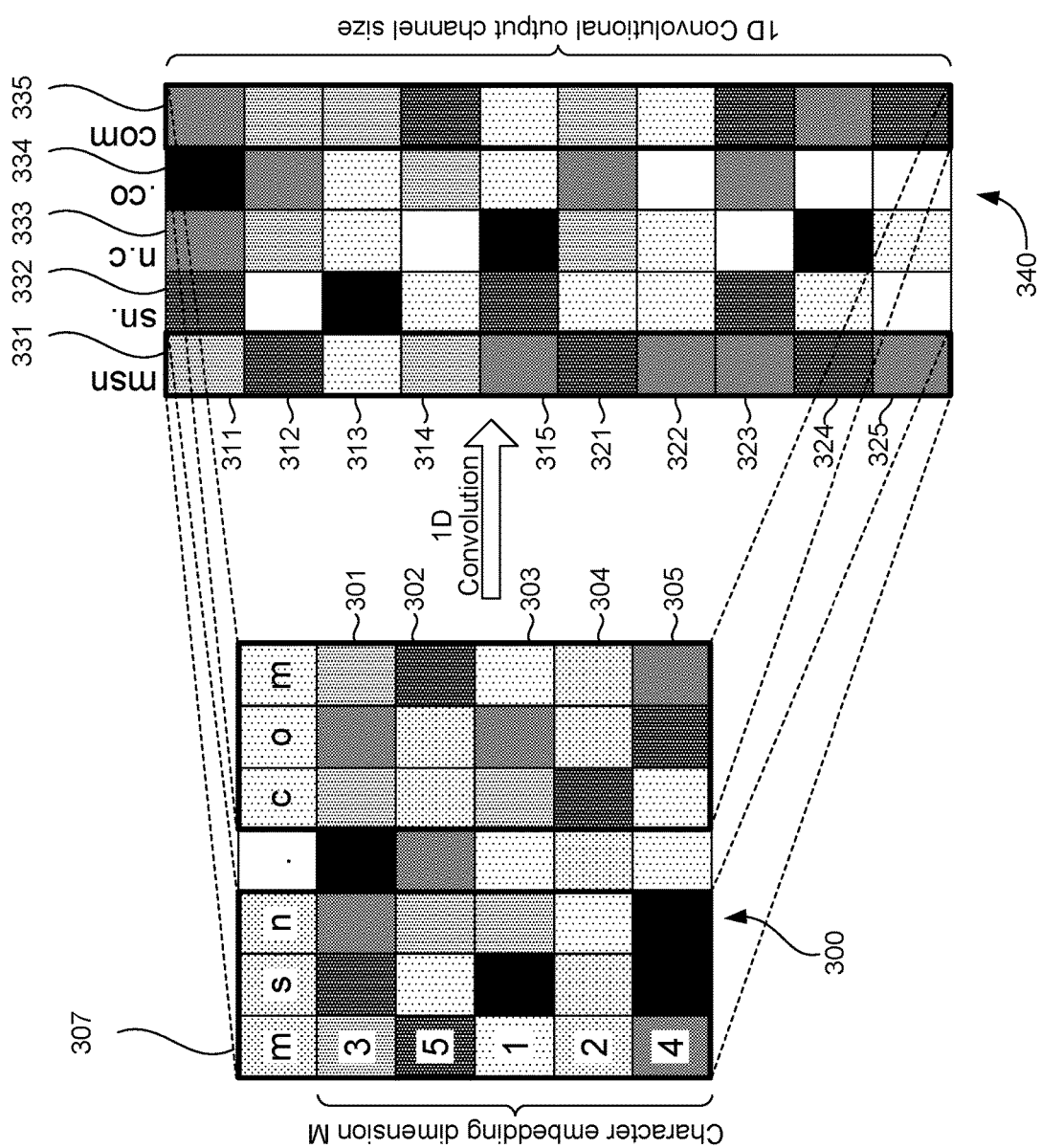
FIG. 3 is an illustration of a convolutional operator applied to embedding vectors of analogized symbols over an analogized sentence.

A matrix of symbol embeddings is illustrated in matrix 300 of FIG. 3. A matrix of symbol embeddings is for example a matrix of character embeddings or a matrix of word embeddings. The character embeddings are generated by the character-embedding component 254, while the word-embedding component 256 builds the word vectors. Only character vectors are shown in FIG. 3, but the word-embedding vectors work in a similar fashion. The example of a matrix of character embeddings is illustrated directly in matrix 300 of FIG. 3 for M=5 and L=7, and for the URL "msn.com." Each column of the matrix 300 of character embeddings illustrates an N dimensional vector. Each value of an element of the N dimensional vector is illustrated as a shaded level that reflects an integer value approximately 0 to 6. The Column under the first "m" illustrates a five dimension embedding vector for the character "m", the column under "s" illustrates a five dimension embedding vector for the character "s", etc. The letters n, c, o, m, and the period symbol each have a similar vector.

In an aspect, an analogized symbol is instead a word formed from adjacent characters in a URL. A feature processor identifies analogized symbols, such as words within the URL. In an aspect, word-embedding component 256 identifies words in the URL. The URL is tokenized into analogized words. In an aspect, special characters within each analogized sentence including ".?/-\_\=%@+;" are used to tokenize each URL to obtain analogized words. As used herein analogized words are a string of adjacent characters that reoccur within different URLs in the training data. The analogized words need not be a word in any language. In an aspect, these special characters are also included in a model vocabulary. Each tokenized word is compared to a predefined model library of words that are encountered within a design corpus of URLs. A vocabulary of analogized words is built by analyzing the frequency of occurrence of a word within the corpus of URLs. In an aspect, newly encountered words are added to a model vocabulary. In an aspect, the model library is derived from a training corpus of URLs of all classes (benign or malicious) that might be encountered. In an aspect, words that appear within a training corpus more than a user-defined number of times in the training set are added to the model library.

An N-dimensional embedding vector is assigned to each analogized word in an URL, to form a symbol matrix such as matrix 300, so that each column of matrix 300 is associated with a word rather than with a single character as shown in FIG. 3. In an aspect, embedding vectors are assigned through a table lookup operation that takes a tokenized word and returns from a table a defined embedding vector. In an aspect, word-embedding component 256 assigns embedding vectors. In an aspect, N=32. In an aspect, a random value is assigned to each element of each embedding vector that is assigned to a unique word in a model library. In an aspect, a unique embedding vector is assigned to multiple words in a model library when a certain number of n-grams of the words match. In an aspect, contextual word embeddings are learned from a corpus of URLs.

Once the vector space is built, URLs can be translated into word embeddings by the word-embedding component 224 used to embed unlabeled URLs. Similarly, the character embeddings can be built by the character-embedding component 222 in the same fashion as described. The result is that the embeddings used to train the classifier 226 take the same form as the embeddings input to the classifier when analyzing a URL.

Figure 4:
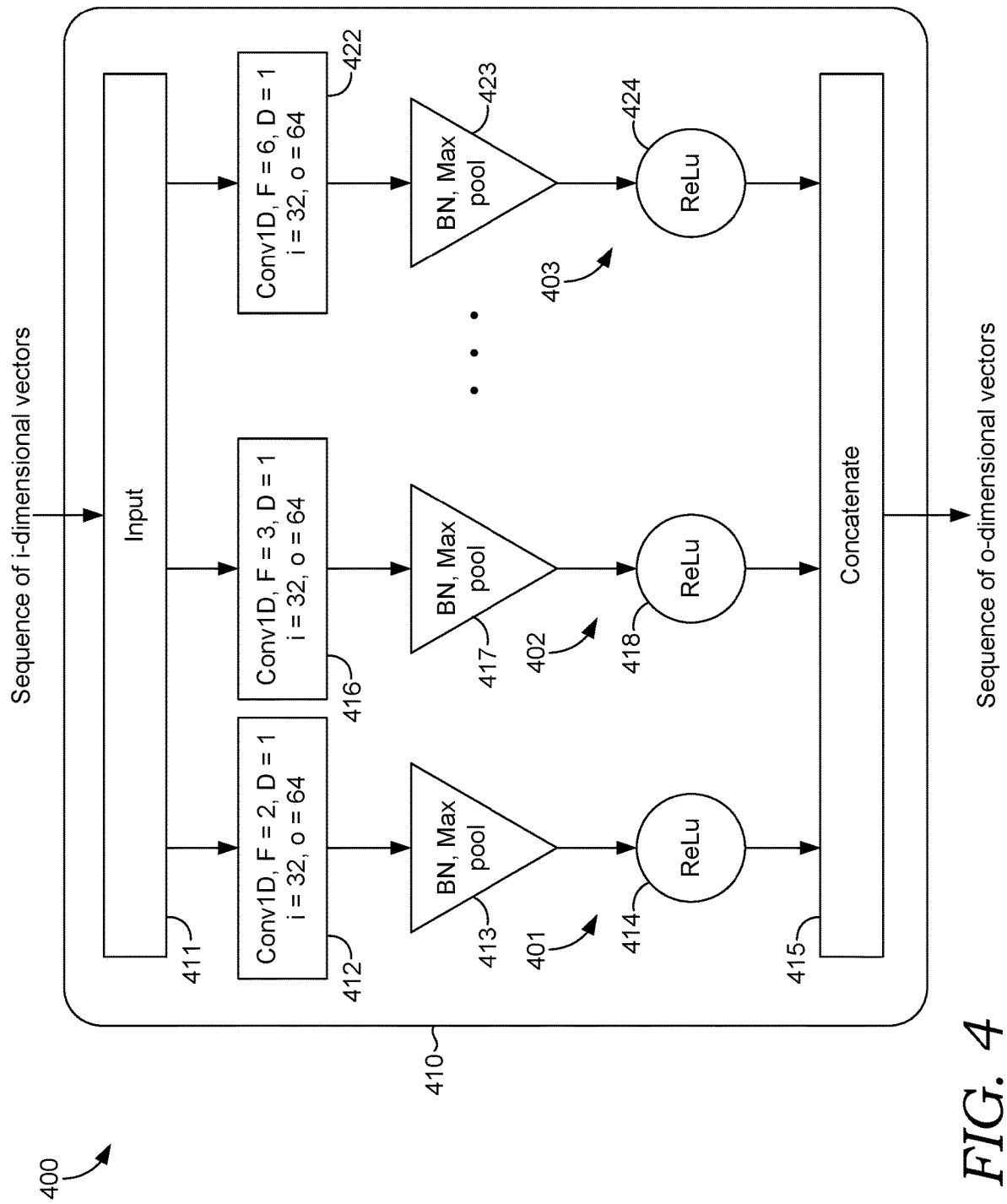
FIG. 4 is an exemplary process flow diagram showing a process of forming an output feature vector.

Turning to FIG. 4, processing block 410 shows exemplary components in a URL processing block that is used to form an output feature vector. As explained with reference to FIG. 5, the output feature vector can be used to generate a classification. An output feature vector, such as the output of concatenation block 415, is formed by concatenation that takes place within concatenation block 415, which takes input from a component processing leg (CPL). In the example shown in FIG. 4, five different CPLs are used, but only three are shown. The presence of the other two is indicated by the dots. From left to right the five CPLs include CPL-A 401, CPL-B 402, CPL-C, CPL-D, and CPL-E 403. Three CPL's are explicitly shown in CPL-A 401, CPL-B 402 and CPL-E 403 of FIG. 4 as vertical paths between input block 411 and concatenation block 415. CPL's CPL-C is a block similar to CPL-B 402 but having parameter F=4, where F is a filter size. CPL-D is a block similar to CPL-B 402, but having parameter F=5. Each CPL, such as CPL-B 402 takes a matrix 300 of symbol embeddings and performs a convolution operation at 412, one or more normalization operations at 413, and a non-linearity operation 414 to form a component feature matrix. Different parameters are defined for each CPL that determine the processing performed within a leg. For example, a parameters for CPL-B 401, which is denoted PS-B, includes a filter size F, a dilation D, an input channel size i, an output channel size o, a max pool window width W, a group size j, and a set of j filter kernel definitions {KD1, KD2, . . . KDj}. Parameter groups are likewise defined for each other leg. Parameter set for CPL-A 401 is PS-A. Parameter set for CPL-C is PS-C. A parameter set for CPL-D is PS-D. A parameter set for CPL-E 403 is PS-E. A Kernel definition is the set of filter terms that define the filter. In an aspect, the kernels defined for filtering are one dimensional. In an aspect, the filter values that define the kernel terms are learned during training. In an aspect, the output size o is specified as an integer multiple of the input size i, thus defining the number of kernels. That is, o=j*i.

Operations performed within a CPL may be generally understood by the processing performed in CPL-B 402. In an aspect, a one dimensional convolution operation is performed at 416 by separate operations that are performed on each row of a matrix 300 of symbol embeddings. For example, Row 311 of convolution output 340 is formed by filtering row 301 using kernel KD1. Row 321 of convolution output 340 is formed by filtering row 301 using kernel KD2. Row 312 of convolution output 340 is formed by filtering row 302 using kernel KD1. Row 322 of convolution output 340 is formed by filtering row 302 using kernel KD2. Likewise Rows 313 and 323 are formed by convolutional processing of kernels KD1 and KD2 over row 303 of symbol matrix 300. Rows 314 and 324 are formed by convolutional processing of kernels KD1 and KD2 over row 304 of symbol matrix 300. Rows 315 and 325 are formed by convolutional processing of kernels KD1 and KD2 over row 305 of symbol matrix 300. Formation of a convolution output 340 feature matrix is made in association with a selected filter length F.

In the example illustrated in FIG. 3, a filter length F=3, Dialation D=1, i=5, and o=10. The terms of K1 and K2 have been learned during training. In producing the elements of the convolution output 340 feature matrix, three symbols at a time are taken through a filter kernel to produce a single element. For example, the output at row 311 and Column 331 is taken from the Row 301 embedding elements under "m" "s" and "n" respectively as a dot product with the elements of kernel KD1. The output at row 311 and column 332 is taken from the row 301 embedding elements under "s", "n", and "." respectively by forming a dot product with the elements of kernel KD1. The example of FIG. 3 provides processing without zero padding, so a URL of length 7 results in a row 311 of convolution output 340 having 5 elements. In an aspect, convolution is performed with zero padding.

In an aspect, a column 331 of convolution output 340 matrix is formed by processing a portion of the embedding vector matrix 300, through a specialized mapping filter. For example, the fifteen elements in rows 301-305 of the embedding vector matrix 300, that are also under the characters "msn" may be processed through a specialized mapping filter to form the 10 outputs found in column 331. Examples of specialized mapping filters include a multiple output adaptive network, a recurrent neural network, and a Long Short Term Memory network (LSTM).

Normalization block 413 performs one or more normalization operations on a convolution output 340 matrix, such as Batch Normalization (BN) and Max Pooling. CNN training is typically done in small batches. In Batch Normalization, each element in the input vector is scaled so that all of the corresponding elements in the training batch has zero mean and unit variance. In a pooling operation, a window of size W within a portion of component feature matrix, such as a row 311, is pooled and an output from the window is determined by an operation such as average, or a rank order, such as a max, a median, or a rank-m. In a rank-m operation, the mth ranked value within a window is output.

Non-linearity operation 414 receives the output of Normalization block 413 and forms a Component Feature Matrix (CFM) for CFL-B, which is denoted CFM-B. In an aspect, a Rectified Linear Unit (ReLU) non-linearity is used. In an aspect, a bias term is applied before application of the ReLU function.

The processing of other legs such as CPL-A 401, CPL-C, CPL-D, and CPL-E 403 are analogous to that performed in CPL-B 401. Thus, branch CPL-A 401 produces a component feature matrix CFM-A. Branch CPL-C produces CFM-C. Branch CPL-D produces CFM-D. Branch CPL-E 403 produces CFM-D. Concatenation block 415 produces an output sequence of o-dimensional vectors from the concatenation of CFM-A, CFM-B, CFM-C, CFM-D and CFM-E.

A block 410 is a basic Text Processing Block (TBP), parametrized by a set of parameters that define the processing operation, such as parameter sets PS-A, PS-B, PS-C, PS-D, and PS-E.

Figure 5:
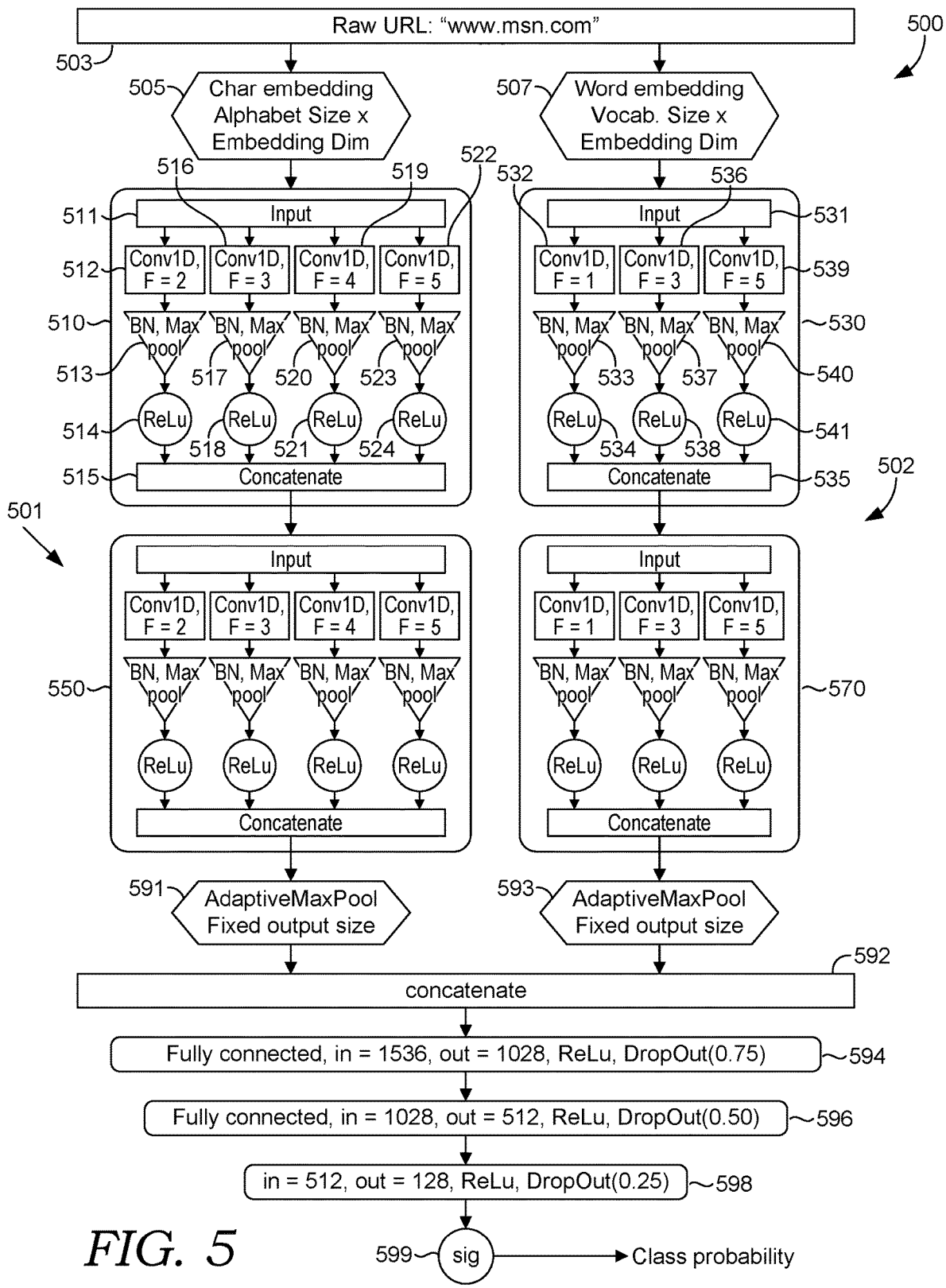
FIG. 5 is an exemplary process flow diagram showing an identification process that forms a decision statistic from output feature vectors produced by exemplary text processing blocks.

Turning now to FIG. 5, by intuition, a 1D convolution of filter size N on the sequence of character embeddings is similar to extracting an N-gram from input text. A benefit of using convolutional layers in parallel, each with different filter sizes, is that this arrangement better captures text patterns compared to multiple consecutive layers with a fixed filter size.

The full model 500 is comprised of two parallel paths, a character-level path 501 for extracting character-level information and a word-level path 502 for working with word-level information. The character-level path 501 first converts a raw URL into a dense matrix of character-embedding vectors as described with reference to FIG. 3. Next, multiple layers of convolutional blocks (e.g., 512, 516, 519) are applied followed by an Adaptive Max Pooling layer (e.g., 513, 517, 520) that limits the dimension of the last block's (e.g., 514, 518, 521) output to a user defined value.

The word-level path 502 first tokenizes the incoming URL using the same regular expression (regex) key that has been used in building the model. Then, the list of words in the URL is matched with the maximum word length, so that longer word lists are trimmed and shorter ones are zero padded. This list then passes through the word-embedding layer 507 to produce a sequence of word vectors, which is followed by multiple convolution blocks (e.g., 532, 536, and 539). The output of the word path is also limited using an Adaptive Max Pooling operator.

Outputs from the character-level path 501 and word-level path 502 are concatenated 592 and input to multiple fully connected layers (e.g., 594, 596, and 598) that eventually produce a class probability. Layers with more nodes have a larger dropout probability. Note that users can choose multiple structures: deeper networks with more consecutive convolutional blocks, wider networks with more parallel layers within the block, using words with pre-trained weights versus random weights or even not using words.

FIG. 5 illustrates the formation of a decision score at the output of sigmoid 599 from the output of one or more text processing blocks, which is used to assign a class probability, such as a probability of malicious or benign. Such a decision score provides a basis to determine a selected class, which is described by a resultant class probability. As an alternative to a sigmoid function, a softmax function could be used. A softmax function could be especially useful when the output designates multiple classes, such as benign, phishing, spam, etc. The output of layer 598 is then a set of N identified features v1, v2, ... vN and a final set of corresponding weights w1, w2, ... wN, that can be processed with a defined offset constant b0 to be processed by a nonlinearity h(.) in sigmoid 599 to produce a decision score d. A representative ANN may produce output d equal to $h(v1*w1+v2*w2+ \ldots +vN*wN+b0)$. The example shown in FIG. 5 has an output feature length of N=128 out of layer 598, which takes 512 input elements from layer 596 and so achieves a dropout of 25%. Layer 596 produces the 512 outputs from a fully connected layer that takes an input of 1028 from layer 594. Layer 596 also has a nonlinear layer at the output to layer 598 and achieves a dropout of 50%. Layer 594 produces the 1028 output to layer 596 by processing an output from concatenation block 592 that provides 1536 inputs. Layer 594 is for example a fully connected convolutional layer with an output nonlinearity such as ReLU, and achieves a dropout rate of 75%. In an aspect, the concatenation block 592 produces the 1536 outputs by taking 512 outputs from adaptive max pool block 591 and concatenating these to 1024 outputs from adaptive max pool block 593.

In an aspect, max pooling block 591 receives 512 inputs from two TBPs that are identical in structure, namely TPB 550 and TPB 510, and that are connected in series. In an aspect, the convolutions of TPB 550 allow for growth of the columns, so that a convolutional block within 550 has input 64 and output 128. In an example, TPB 510 is configured with four legs as shown. Convolutional block 512 has F=2. Convolutional block 516 has F=3. Convolutional block 519 has F=4. Convolutional block 522 has F=5. The variable F corresponds to input filter size. Thus, a block with a filter of 4 will take four adjacent characters from the URL as input.

Each convolutional block is connected to input 511, and configured for 32 dimensional input vectors and 64 dimensional output vectors. Each Convolution block is followed by corresponding normalization blocks 513, 517, 520 and 523, and by corresponding nonlinearity blocks 514, 518, 521 and 524, before being concatenated together to form a vector of length 256 at the output of concatenation block 515. Character-embedding block 505 creates a character-embedding matrix 300 from the raw input string received from URL identification block 503, and passes the input to TPB 510.

In an aspect, max pooling block 593 receives 1024 inputs from two TPBs that are identical in structure, namely TPB 570 and TPB 530, and that are connected in series. In an aspect, the convolutions of TPB 570 allow for growth of the columns, so that a convolutional block within 570 has input 64 and output 128. In an aspect, TPB 530 includes three parallel processing paths for 32-dimensional word embedding vectors. In an aspect, TPB 510 includes a convolutional block 532 configured with F=1, i=32, o=64, j=2, D=1. F describes the filter size. A filter size of 1 indicates that the input will be a single word-embedding vector. The word-embedding vector represents a single word that can comprises different amounts of characters or even just one character. In an aspect, convolutional filter block 536 is configured with F=3, o=64, j=2, D=1. A filter size of 3 indicates that the input will be three word-embedding vectors. In an aspect, convolutional filter block 539 is configured with F=5, o=64, j=2, D=1. A filter size of 5 indicates that the input will be five word-embedding vectors. TPB 530 takes a word-embedding matrix derived from a raw URL and performs convolution. Word-embedding block 507 creates a word-embedding matrix, such as matrix 300 from the raw input string received from analogized sentence identification block 503, and passes the input to TPB 530. Input processing block 531 passes the word-embedding matrix to each of the convolutional blocks 532, 536 and 539. Convolutional block 532 performs the specified convolution on the input and passes the output to a normalization block 533, which passes its output through nonlinear block 534 to concatenation block 535. Convolutional block 536 performs the specified convolution on the input and passes the output to a normalization block 537, which passes its output through nonlinear block 538 to concatenation block 535. Convolutional block 539 performs the specified convolution on the input and passes the output to a normalization block 540, which passes its output through nonlinear block 541 to concatenation block 535.

In an aspect, an adaptive max pool block such as 591 allows a user to specify the fixed output size. In an aspect, adaptive max pool block 593 operates at an output size of 32. In an aspect, adaptive max pool block 593 operates at an output size of 16. In an aspect, adaptive max pool block 591 operates at an output size of 32.

In an aspect, a decision score produced by sigmoid 599 is based on an output feature matrix from TPB 510. In an aspect, a decision score produced by sigmoid 599 is based on an output feature matrix from TPB 530. In an aspect, a decision score produced by sigmoid 599 is based on an output feature matrix from TPB 510 and on an output feature matrix from TPB 530. In an aspect, a decision score produced by sigmoid 599 is based on an output feature matrix from TPB 550 when TPB 550 is configured in series, to take an input feature matrix from TPB 510. In an aspect, a decision score produced by sigmoid 599 is based on an output feature matrix from TPB 570 when TPB 570 is configured in series, to take an input feature matrix from TPB 530. In an aspect, a decision score produced by sigmoid 599 is based on deep learning of two or more convolutional layers derived from one or more TPBs such as TPB 510, TPB 530, TPB 550 and TPB 570.

In an aspect, the inputs are URL's that are evaluated for different levels of threat. In an aspect, a decision score is used to grade the threat level of a URL. A decision score is compared to a threshold, and assigned a grade or an integer level. The output of sigmoid 599 is a decision score d. The decision score d is compared to one or more thresholds to determine a Threat Level (TL) class, e.g. an integer between 0 to 5 indicating the danger level of the URL, with 0 being the least threatening and 5 being the most threatening URL. If a threshold is set at TL>3, a URL is deemed threatening if the sigmoid decision score is indicates TL=4 or TL=5. A computer display displays a warning in an alert box, indicating on a graphical user interface that the URL requested by a user of computer is likely associated with a phishing attack when sigmoid 599 determines TL>3. In an aspect, TL=5 is indicated to the user as a high level of threat, TL=4 is indicated as a moderately high threat level. TL=3 is indicated as a moderate threat level. TL=2 is indicated as a low level of threat. TL=1 is indicated as a very low level of threat. TL=0 is indicated as no threat. In an aspect, ten threat levels are used.

Figure 6:
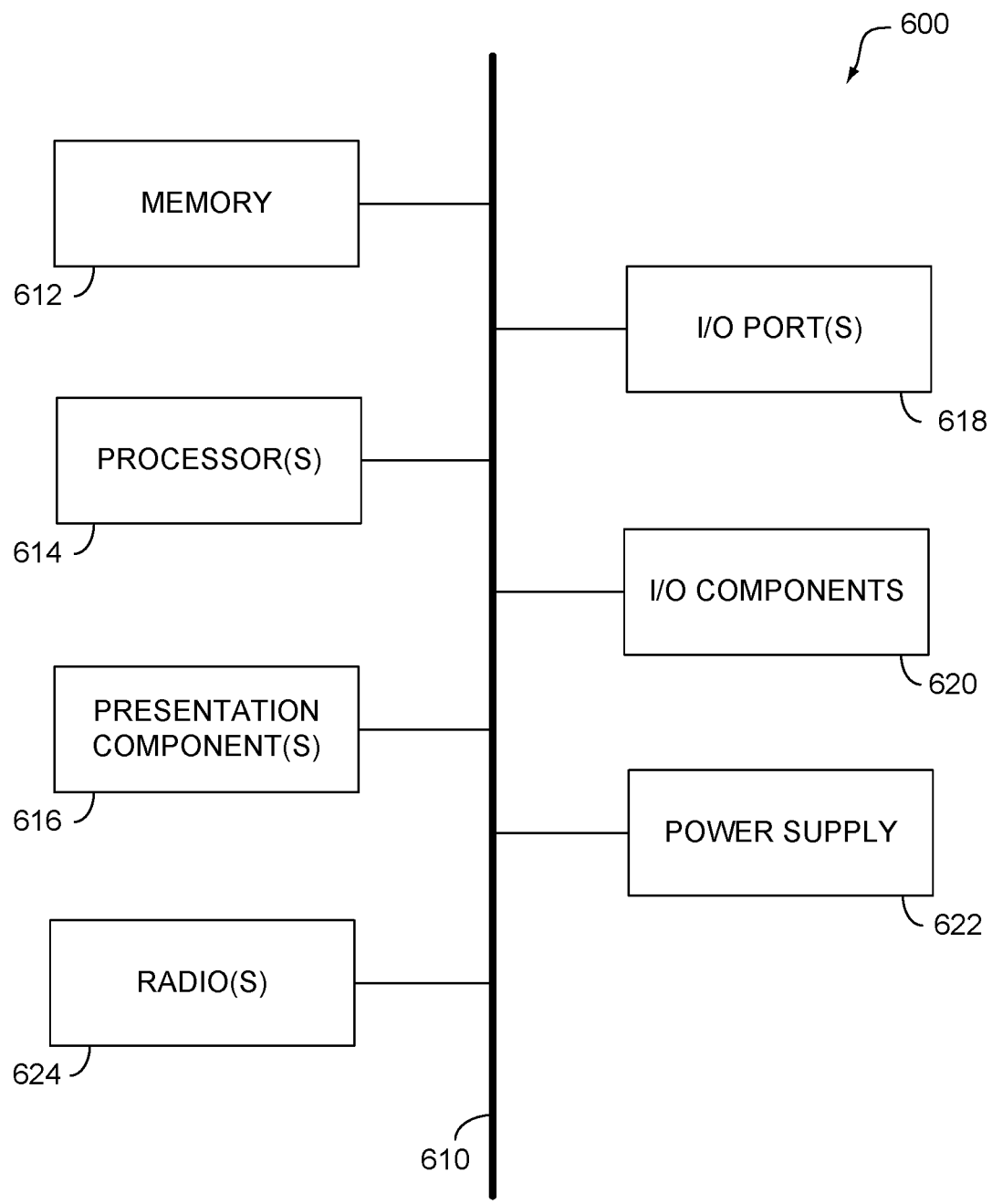
FIG. 6 is a block diagram of an exemplary computing environment suitable for use in implementing an aspect of the technology.
Figure 7:
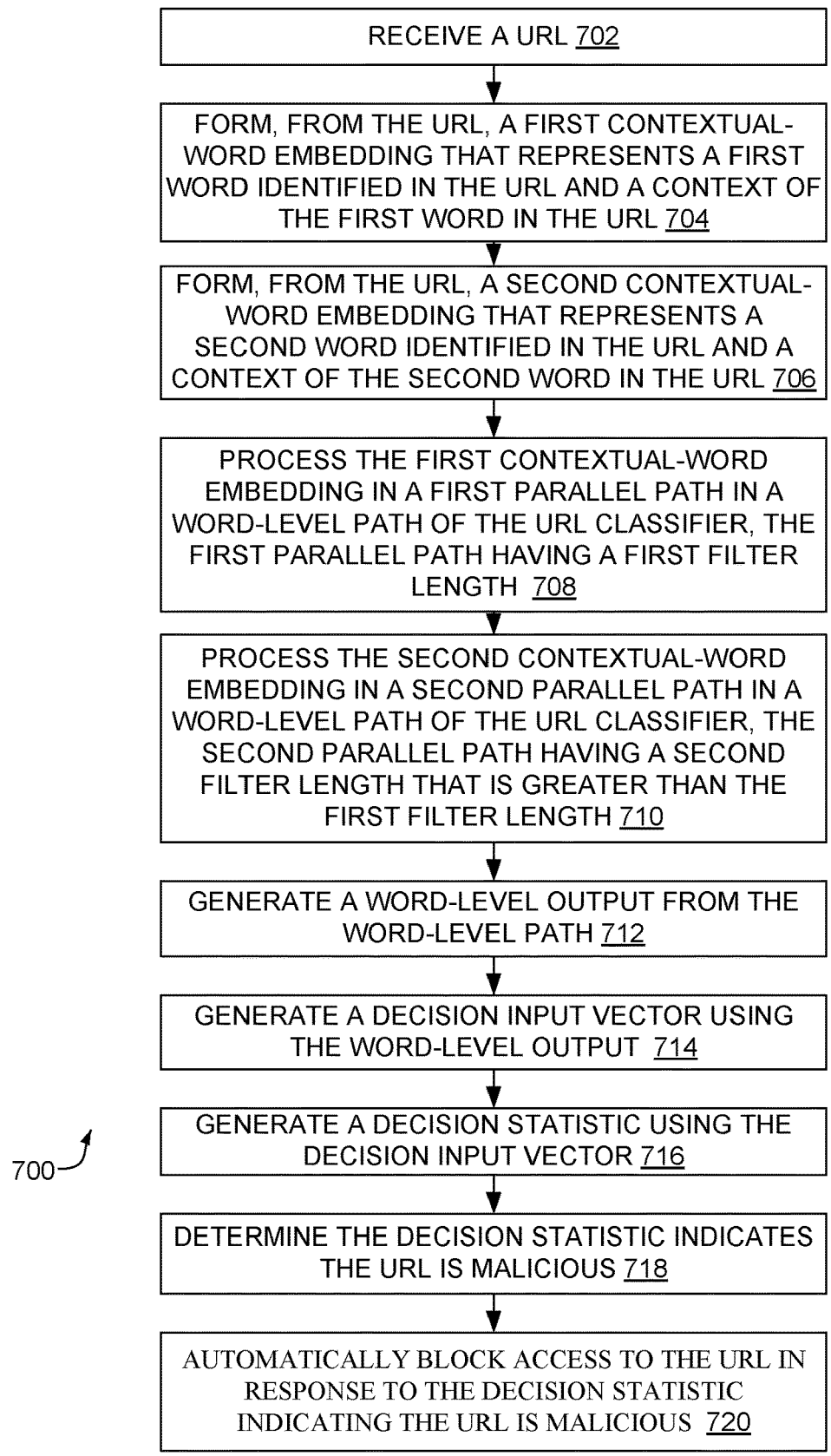
FIG. 7 is a flow chart showing a method of classifying a URL, according to an aspect of the technology described herein.
Figure 8:
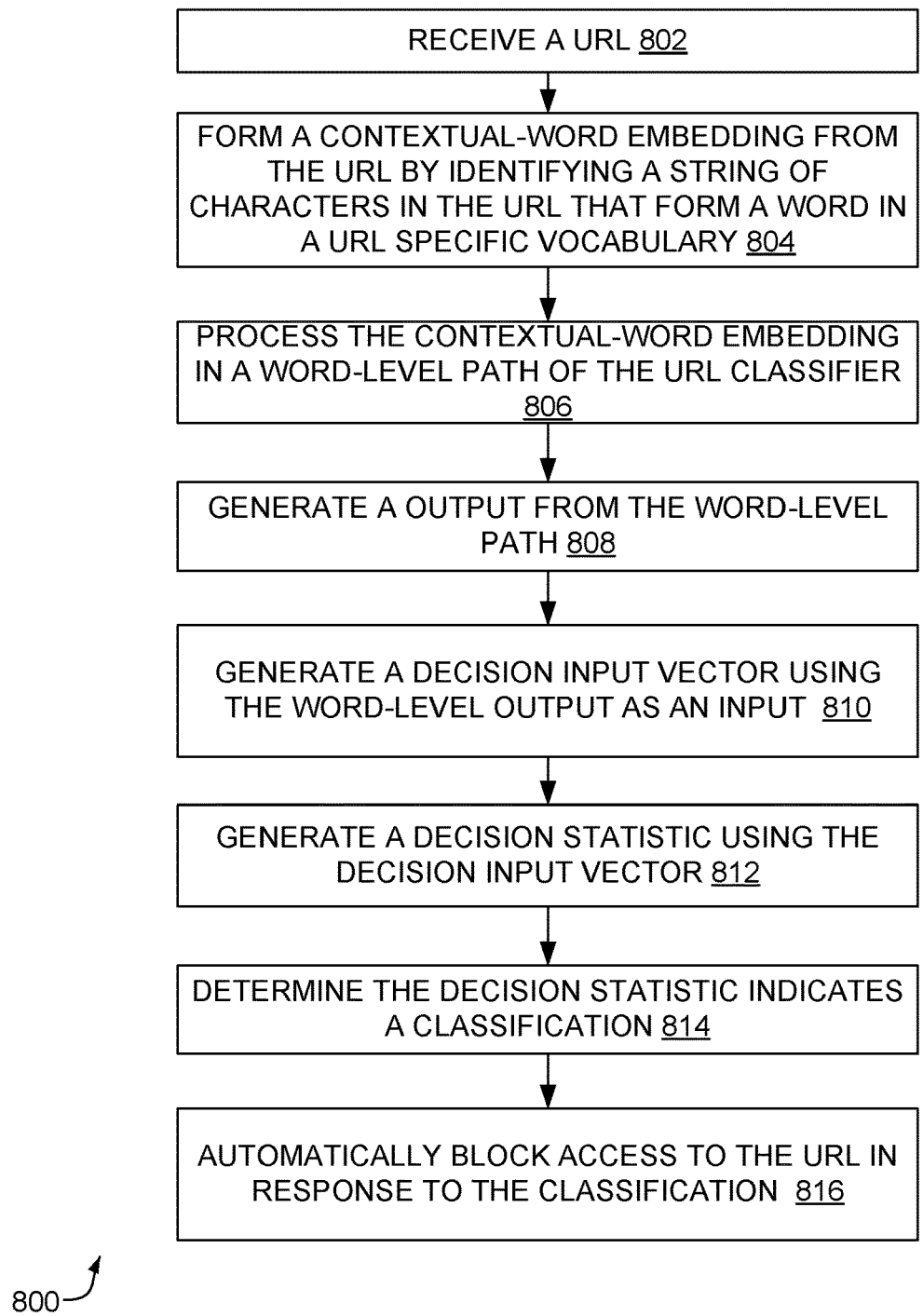
FIG. 8 is a flow chart showing a method of classifying a URL, according to an aspect of the technology described herein.
Figure 9:
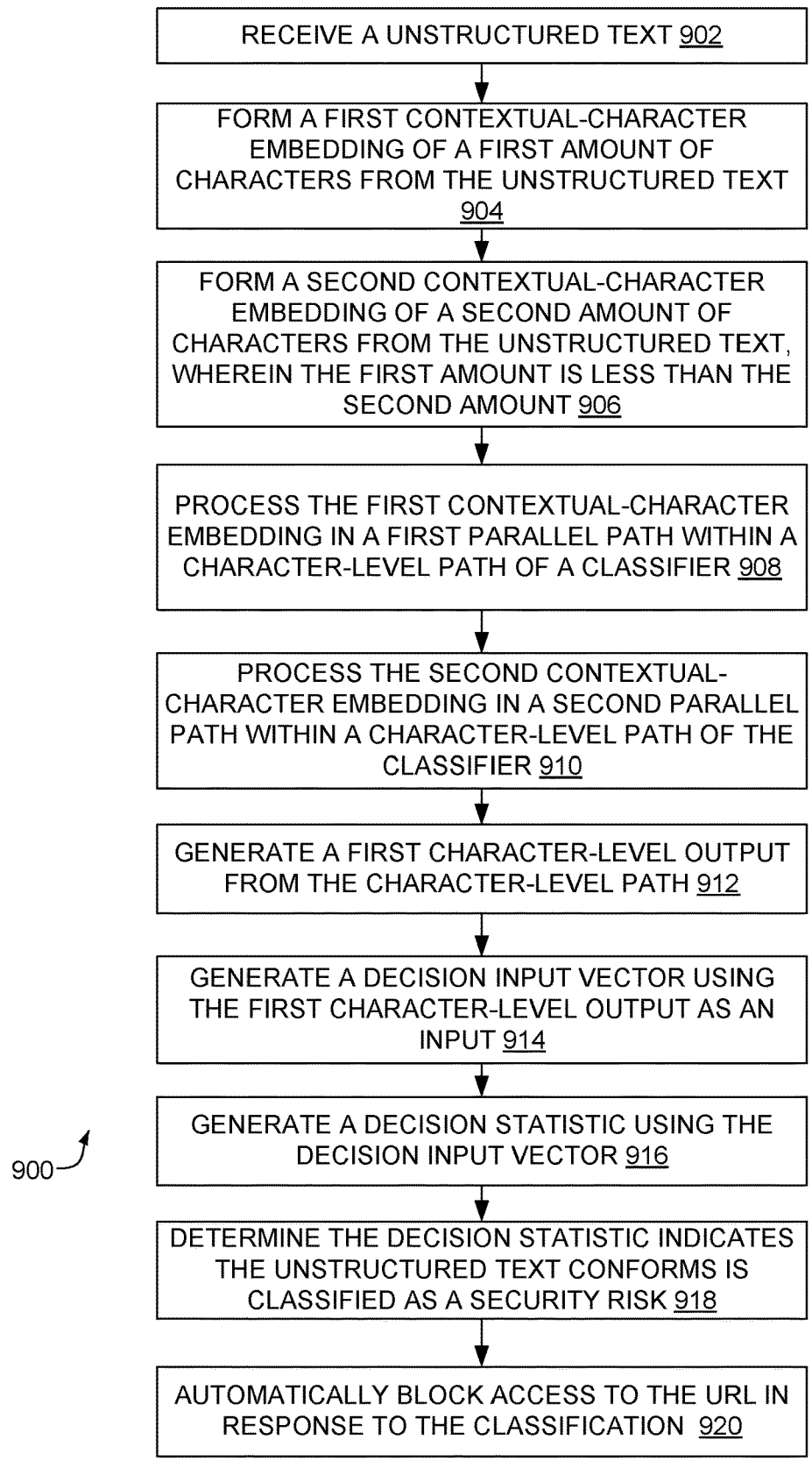
FIG. 9 is a flow chart showing a method of classifying a URL, according to an aspect of the technology described herein.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Turning now to FIG. a method 700 for displaying a class indication for unstructured text in a URL. Method 700 may be performed by system 200 described previously.

At step 702 the method comprises, receiving a URL. The URL may be received as part of an on-demand URL analysis. An on-demand analysis occurs in real time. The on-demand analysis may first compare the URL to a list of known malicious URLs or benign URLs. Upon not finding the URL on a list, the analysis described subsequently may proceed. The on-demand analysis may be triggered by the user entering a URL in a browser, receiving an email, text, or social media content with an embedded URL (e.g., a hyperlink), navigating to a website with a link to the URL, or in response to other actions. The technology described herein is not limited to use with an on-demand service. For example, the technology may evaluate new URLs registered with a domain name service.

At step 704 the method comprises, forming, from the URL, a first contextual-word embedding that represents a first word identified in the URL and represents a context of the first word in the URL. Contextual-word embedding has been described previously, for example, with reference to FIGS. 2-5.

At step 706 the method comprises, forming, from the URL, a second contextual-word embedding that represents a second word identified in the URL and a represents context of the second word in the URL. Contextual-word embedding has been described previously, for example, with reference to FIGS. 2-5.

At step 708 the method comprises, processing the first contextual-word embedding in a first parallel path in a word-level path of the URL classifier, the first parallel path having a first filter length. Processing an embedding has been described previously with reference to FIGS. 2-5, for example.

At step 710 the method comprises, processing the second contextual-word embedding into a second parallel path in a word-level path of the URL classifier, the second parallel path having a second filter length that is greater than the first filter length. Processing an embedding has been described previously with reference to FIGS. 2-5, for example.

At step 712 the method comprises, generating a word-level output from the word-level path.

At step 714 the method comprises, generating a decision input vector using the word-level output. In one aspect, the word-level output may be combined with a character-level output from a parallel character-level path through a concatenation. Generating a decision input vector has been described previously with reference to FIGS. 2-5, for example.

At step 716 the method comprises, generating a decision statistic using the decision input vector. Generating a decision statistic has been described previously with reference to FIGS. 2-5, for example.

At step 718 the method comprises, determining the decision statistic indicates the URL is malicious. The decision statistic can be a number. A number falling into a certain range can indicate the URL is malicious. If outside the malicious range, the URL may be benign.

At step 720 the method comprises, blocking access to the URL in response to the decision statistic indicating the URL is malicious. A web browser could disable a link to a web page associated with the unstructured text. A communication program could quarantine an email, text, social media post, video, blog, or other content associated with the unstructured text. For example, an email with a link associated with the unstructured text could be moved to a junk email box. In one aspect, a source of the unstructured text is blocked from communicating any additional content to an entity for which the unstructured text is being classified. For example, emails addresses, IP addresses, social media accounts, Internet domains, could be added to a block list. The entity may be asked to confirm addition of the source to the block list. In one aspect, all code on a content source (e.g., web page) associated with the unstructured text is automatically stopped.

A warning can also be provided. The warning can take many forms. The warning can be provided by turning a link to the URL red, the address bar red, outputting a pop-up warning, and the like. In addition to the warning, links to the URL can be disabled and the webpage found at the URL can be prevented from loading. The URL can be submitted to a service that tracks malicious URLs.

Turning now to FIG. a method 800 for displaying a class indication for unstructured text in a URL. Method 800 may be performed by system 200 described previously.

At step 802 the method comprises, receiving a URL. The URL may be received as part of an on-demand URL analysis. An on-demand analysis occurs in real time. The on-demand analysis may first compare the URL to a list of known malicious URLs or benign URLs. Upon not finding the URL on a list, the analysis described subsequently may proceed. The on-demand analysis may be triggered by the user entering a URL in a browser, receiving an email, text, or social media content with an embedded URL (e.g., a hyperlink), navigating to a website with a link to the URL, or in response to other actions. The technology described herein is not limited to use with an on-demand service. For example, the technology may evaluate new URLs registered with a domain name service.

At step 804 the method comprises, forming a contextual-word embedding from the URL by identifying a string of characters in the URL that form a word in a URL specific vocabulary. Contextual-word embedding has been described previously, for example, with reference to FIGS. 2-5.

At step 806 the method comprises, processing the contextual-word embedding in a word-level path of a URL classifier. Inputting an embedding has been described previously with reference to FIGS. 2-5, for example.

At step 808 the method comprises, generating a word-level output from the word-level path. Generating outputs from the word-level path has been described previously with reference to FIGS. 2-5, for example.

At step 810 the method comprises, generating a decision input vector using the word-level output as an input. Generating a decision input vector has been described previously with reference to FIGS. 2-5, for example.

At step 812 the method comprises, generating a decision statistic using the decision input vector. Generating a decision statistic has been described previously with reference to FIGS. 2-5, for example.

At step 814 the method comprises, determining the decision statistic indicates the URL is malicious. The decision statistic can be a number. A number falling into a certain range can indicate the URL is malicious. If outside the malicious range, the URL may be benign.

At step 816 the method comprises, automatically blocking access to content associated with the unstructured text in response to the classification. A web browser could disable a link to a web page associated with the unstructured text. A communication program could quarantine an email, text, social media post, video, blog, or other content associated with the unstructured text. For example, an email with a link associated with the unstructured text could be moved to a junk email box. In one aspect, a source of the unstructured text is blocked from communicating any additional content to an entity for which the unstructured text is being classified. For example, emails addresses, IP addresses, social media accounts, Internet domains, could be added to a block list. The entity may be asked to confirm addition of the source to the block list. In one aspect, all code on a content source (e.g., web page) associated with the unstructured text is automatically stopped.

The blocking may be accompanied by a warning. The warning can take many forms. The warning can be provided by turning a link to the URL red, the address bar red, outputting a pop-up warning, and the like. In addition to the warning, links to the URL can be disabled and the webpage found at the URL can be prevented from loading. The URL can be submitted to a service that tracks malicious URLs.

Turning now to FIG. a method 900 for displaying a class indication for unstructured text. Method 900 may be performed by system 200 described previously.

At step 902 the method comprises, receiving an unstructured text. In an aspect, the unstructured text is not a natural language composition following grammatical conventions. Instead, the unstructured text may be non-grammatical. The unstructured text may include strings of characters that do not form words in a known language. The unstructured text may be without any metadata. The unstructured text could be a URL, email address, user name, social media account title, trademark, hashtag, or the like.

At step 904 the method comprises, forming a first contextual-character embedding of a first amount of characters from the unstructured text. Contextual-character embedding has been described previously, for example, with reference to FIGS. 2-5.

At step 906 the method comprises, forming a second contextual-character embedding of a second amount of characters from the unstructured text, wherein the first amount is less than the second amount. Contextual-character embedding has been described previously, for example, with reference to FIGS. 2-5.

At step 908 the method comprises, processing the first contextual-character embedding in a first parallel path within a character-level path of a classifier. Processing an embedding has been described previously with reference to FIGS. 2-5, for example.

At step 910 the method comprises, processing the second contextual-character embedding in a second parallel path within a character-level path of the classifier. Processing an embedding has been described previously with reference to FIGS. 2-5, for example.

At step 912 the method comprises, generating a first character-level output from the character-level path. Generating character-level output has been described previously with reference to FIGS. 2-5, for example.

At step 914 the method comprises, generating a decision input vector using the first character-level output as an input. Generating a decision input vector has been described previously with reference to FIGS. 2-5, for example.

At step 916 the method comprises, generating a decision statistic using the decision input vector. Generating a decision statistic has been described previously with reference to FIGS. 2-5, for example.

At step 918 the method comprises, determining the decision statistic indicates the unstructured text is classified as a security risk. The decision statistic can be a number. A number falling into a certain range can indicate the URL is malicious. If outside the malicious range, the URL may be benign.

At step 920 the method comprises, automatically blocking access to content associated with the unstructured text in response to the classification. For example, a web browser could disable a link to a web page associated with the unstructured text. A communication program could quarantine an email, text, social media post, video, blog, or other content associated with the unstructured text. For example, an email with a link associated with the unstructured text could be moved to a junk email box. In one aspect, a source of the unstructured text is blocked from communicating any additional content to an entity for which the unstructured text is being classified. For example, emails addresses, IP addresses, social media accounts, Internet domains, could be added to a block list. The entity may be asked to confirm addition of the source to the block list. In one aspect, all code on a content source (e.g., web page) associated with the unstructured text is automatically stopped.

A warning can also be provided. The warning can take many forms. If the unstructured text is a URL, then the warning can be provided by turning a link to the URL red, the address bar red, outputting a pop-up warning, and the like. In addition to the warning, links to the URL can be disabled and the webpage found at the URL can be prevented from loading. The URL can be submitted to a service that tracks malicious URLs.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. One or more computer storage media having computer-executable instructions embodied thereon that, when executed, by one or more processors, causes the one or more processors to perform a method for detecting a malicious URL, the method comprising:
   receiving a URL;
   forming, from the URL, a first contextual-word embedding that represents a first word identified in the URL and represents a context of the first word in the URL;
   forming, from the URL, a second contextual-word embedding that represents a second word identified in the URL and represents a context of the second word in the URL;
   processing the first contextual-word embedding in a first parallel component processing leg in a word-level path of the URL classifier, the first parallel component processing leg having a first filter length, a first set of filters learned during training, a first normalization operation, a first pooling operation, and a first activation operation;
   processing the second contextual-word embedding in a second parallel component processing leg in a word-level path of the URL classifier, the second parallel component processing leg having a second filter length that is greater than the first filter length, a second set of filters learned during training, a second normalization operation, a second pooling operation, and a second activation operation;
   generating a word-level output from the word-level path by concatenating a first output from the first activation operation and a second output from the second activation operation;
   generating a decision input vector using the word-level output;
   generating a decision statistic using the decision input vector;
   determining the decision statistic indicates the URL is malicious; and
   automatically blocking access to the URL in response to the decision statistic indicating the URL is malicious.

2. The media of claim 1, further comprising:
   forming a contextual-character embedding from the URL;
   inputting the contextual-character embedding into a character-level path of the URL classifier, wherein an input layer of the character-level path comprises a plurality of parallel convolutional layers; and
   generating a character-level output from the character-level path.

3. The media of claim 2, wherein each of the plurality of parallel convolutional layers in the character-level path has an input filter of a different amount of characters.

4. The media of claim 1, wherein an input layer of the word-level path comprises a plurality of parallel convolutional layers.

5. The media of claim 4, wherein each of the plurality of parallel convolutional layers in the word-level path has an input filter for words comprising a different amount of characters.

6. The media of claim 1, wherein the first word is identified by identifying a string of characters in the URL that match a word in a URL specific vocabulary.

7. The media of claim 6, wherein the URL specific vocabulary is generated by decomposing a corpus of URLs into n-grams and then adding n-grams that occur above a threshold number of times within the corpus to the URL specific vocabulary.

8. A method for detecting a malicious URL, the method comprising:
   receiving a URL;
   forming a contextual-word embedding from the URL by identifying a string of characters in the URL that match a word in a URL specific vocabulary;
   processing the contextual-word embedding in a word-level path of a URL classifier, wherein the word-level path comprises a first text processing block and a second text processing block arranged in series, wherein the first text processing block includes a first set of parallel convolutional layers, a first set of parallel pooling layers, a first set of parallel activation layers, and a first concatenation layer to generate a first matrix from an output of the first set of parallel activation layers, and wherein the second text processing block includes a second set of parallel convolutional layers, a second set of parallel pooling layers, and a second set of parallel activation layers;
   generating a word-level output from the word-level path;
   generating a decision input vector using the word-level output as an input;
   generating a decision statistic using the decision input vector;
   determining the decision statistic indicates a classification; and automatically blocking access to the URL in response to the classification.

9. The method of claim 8, wherein the URL specific vocabulary is generated by decomposing a corpus of URLs into n-grams and then adding n-grams that occur above a threshold number of times within the corpus to the URL specific vocabulary.

10. The method of claim 8, wherein an input layer of the word-level path comprises a plurality of parallel convolutional layers.

11. The method of claim 10, wherein each of the plurality of parallel convolutional layers in the word-level path has an input filter for words comprising a different amount of characters.

12. The method of claim 8, wherein, excluding training data, the URL is the only input processed to generate the decision statistic.

13. The method of claim 8, wherein the method further comprises:
   forming a contextual-character embedding from the URL;
   inputting the contextual-character embedding into a character-level path of the URL classifier;
   generating a character-level output from the character-level path; and
   wherein the character-level output is also used to form the decision input vector.

14. The method of claim 13, wherein an input layer of the character-level path comprises a plurality of parallel convolutional layers, and wherein each of the plurality of parallel convolutional layers in the character-level path has an input filter of a different amount of characters.

15. The method of claim 14, wherein the contextual-word embedding represents a first word identified in the URL and a context of the first word in the URL.

16. A method for detecting a malicious URL, the method comprising:
   receiving an unstructured text;
   forming a first contextual-character embedding of a first amount of characters from the unstructured text;
   forming a second contextual-character embedding of a second amount of characters from the unstructured text, wherein the first amount is less than the second amount;
   processing the first contextual-character embedding in a first parallel component processing leg within a character-level path of a classifier, wherein the first parallel component processing leg includes a first set of filters learned during training, a first normalization operation, a first pooling operation, and a first activation operation;
   processing the second contextual-character embedding in a second parallel component processing leg within the character-level path of the classifier, wherein the second parallel component processing leg includes a second set of filters learned during training, a second normalization operation, a second pooling operation, and a second activation operation;
   generating a first character-level output from the character-level path by concatenating a first output from the first activation operation with a second output from the second activation operation;
   generating a decision input vector using the first character-level output as an input;
   generating a decision statistic using the decision input vector;
   determining the decision statistic indicates the unstructured text is classified as a security risk; and
   automatically blocking access to the content associated with the unstructured text in response to the classification.

17. The method of claim 16, wherein an input layer of the character-level path comprises a plurality of parallel convolutional layers.

18. The method of claim 16, further comprising:
   forming a contextual-word embedding from the unstructured text;
   inputting the contextual-word embedding into a word-level path of the classifier;
   generating a word-level output from the word-level path; and
   wherein the word-level output is also used to form the decision input vector.

19. The method of claim 18, wherein an input layer of the word-level path comprises a plurality of parallel convolutional layers, and wherein each of the plurality of parallel convolutional layers in the word-level path has an input filter for words comprising a different amount of characters.

20. The method of claim 16, wherein, excluding training data, the unstructured text is the only input processed to generate the decision statistic.

* * * * *